(12) United States Patent
Chung et al.

(10) Patent No.: US 11,163,102 B2
(45) Date of Patent: Nov. 2, 2021

(54) BACKLIGHT MODULE AND LIGHT GUIDE PLATE THEREOF AND DISPLAY DEVICE USING THE SAME

(71) Applicant: Innolux Corporation, Miao-Li County (TW)

(72) Inventors: Chao-Fang Chung, Miao-Li County (TW); Yen-Liang Chen, Miao-Li County (TW); Chen-Chia Wu, Miao-Li County (TW); Chao-Chun Huang, Miao-Li County (TW); Ming-Hui Chu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/662,109

(22) Filed: Oct. 24, 2019

(65) Prior Publication Data

US 2020/0166693 A1 May 28, 2020

(30) Foreign Application Priority Data

Nov. 23, 2018 (CN) .......................... 201811407203.7

(51) Int. Cl.
*F21V 8/00* (2006.01)
(52) U.S. Cl.
CPC ......... *G02B 6/0053* (2013.01); *G02B 6/0038* (2013.01)
(58) Field of Classification Search
CPC ............................ G02B 6/0053; G02B 6/0038
USPC ....................................................... 362/606
See application file for complete search history.

(56) References Cited

U.S. PATENT DOCUMENTS

| 5,724,108 | A  | * | 3/1998 | Shibata   | G02B 6/0053 349/62    |
| 6,356,389 | B1 | * | 3/2002 | Nilsen    | G02B 1/118 359/625    |
| 6,421,103 | B2 | * | 7/2002 | Yamaguchi | G02F 1/133602 349/113 |
| 6,527,410 | B2 | * | 3/2003 | Yamaguchi | G02B 5/0284 349/64    |
| 7,066,634 | B2 | * | 6/2006 | Kitamura  | G02B 6/0028 362/600   |

(Continued)

FOREIGN PATENT DOCUMENTS

TW         I556024 B      11/2016

*Primary Examiner* — Bryon T Gyllstrom
(74) *Attorney, Agent, or Firm* — McClure, Qualey & Rodack, LLP (57) ABSTRACT

A backlight module includes a light guide plate having an upper surface, a lower surface, and light-adjusting structures on the lower surface; an optical sheet disposed opposite to the upper surface of the light guide plate; and a light source disposed adjacent to the light guide plate, wherein a light emitted by the light source has a first brightness distribution in a first direction after passing through the light guide plate, and the first brightness distribution has a first maximum brightness corresponding to a first angle and a second maximum brightness corresponding to a second angle, and an absolute value of the first angle and an absolute value of the second angle are greater than 60 degrees, respectively, wherein an absolute value of a difference between the first maximum brightness and the second maximum brightness is less than or equal to 30% of the first maximum brightness.

19 Claims, 8 Drawing Sheets

(56) References Cited

U.S. PATENT DOCUMENTS

| | | | |
|---|---|---|---|
| 7,320,531 B2* | 1/2008 | West | G02F 1/133603 |
| | | | 362/231 |
| 7,710,512 B2* | 5/2010 | Lee | G02F 1/133606 |
| | | | 349/64 |
| 8,721,149 B2* | 5/2014 | Holman | F21V 5/10 |
| | | | 362/609 |
| 10,175,413 B2* | 1/2019 | Nichol | G02B 6/0078 |
| 2003/0133301 A1* | 7/2003 | Mullen | G02B 5/045 |
| | | | 362/332 |
| 2004/0080938 A1* | 4/2004 | Holman | F21S 8/08 |
| | | | 362/231 |
| 2005/0046321 A1* | 3/2005 | Suga | G02B 6/0041 |
| | | | 313/112 |
| 2011/0141765 A1 | 6/2011 | Chang et al. | |
| 2017/0235036 A1* | 8/2017 | Nichol | G02B 6/0036 |
| | | | 362/606 |

* cited by examiner

BACKLIGHT MODULE AND LIGHT GUIDE PLATE THEREOF AND DISPLAY DEVICE USING THE SAME

This application claims the benefit of People's Republic of China application Serial No. 201811407203.7, filed Nov. 23, 2018, the subject matter of which is incorporated herein by reference.

BACKGROUND OF THE DISCLOSURE

Field of the Disclosure

The disclosure relates in general to a backlight module and a light guide plate thereof and a display device using the same, and more particularly to a backlight module capable of controlling an outgoing light angle and a light guide plate thereof and a display device using the same.

Description of the Related Art

Electronic products with display devices are indispensable for modern people, whether they are working and studying, or living and leisure. From personal 3C such as smart phones, tablets, notebooks to large and small products such as TVs, electronic billboards and even car display devices, many related products are filled with daily parts. Consumers have different pursuits and expectations for the electronic characteristics of different electronic products as well as their product purposes.

For example, for a display device that requires sufficient brightness to clearly display an image and has an anti-peep function, it becomes important to concentrate the light of the display screen on the viewer's viewing area to achieve a good collimation function. The conventional light guide plate forms a misty mesh point (for example, particles in the mesh point) for uniformly outgoing light when the light hits the mesh point (that is, isotropically emitted toward the four sides), so that the outgoing light angle may not be adjusted to concentrate the light source. In addition, other light guide plates known to regulate the outgoing light angle are generally produced by injection molding, and expensive molds are needed to form a precise patterned structure on the light guide plate. Therefore, if the medium and large size backlight module is needed to attain the collimated light in application, whether technical or cost-effective considerations, is difficult to achieve.

SUMMARY OF THE DISCLOSURE

The disclosure relates to a backlight module, a light guide plate thereof and a display device using the same, which utilizes a light-adjusting structure of a light guide plate to control a outgoing light angle.

According to the present disclosure, a backlight module is provided. The backlight module includes a light guide plate having an upper surface, a lower surface, and light-adjusting structures on the lower surface; an optical sheet disposed opposite to the upper surface of the light guide plate; and a light source disposed adjacent to the light guide plate, wherein the light emitted by the light source has a first brightness distribution in a first direction after passing through the light guide plate, the first brightness distribution has a first maximum brightness and a second maximum brightness, and the first maximum brightness corresponds to a first angle, the second maximum brightness corresponds to a second angle, and an absolute value of the first angle and an absolute value of the second angle are greater than 60 degrees, respectively, wherein an absolute value of the difference between the first maximum brightness and the second maximum brightness is less than or equal to 30% of the first maximum brightness.

According to the present application, a light guide plate is provided. The light guide plate includes an upper surface, a lower surface, and light-adjusting structures on the lower surface; when the light passes through the light guide plate, a first brightness distribution is in a first direction, and the first brightness distribution has a first maximum brightness and a second maximum brightness, the first maximum brightness corresponds to a first angle, and the second maximum brightness corresponds to a second angle, and an absolute value of the first angle and an absolute value of the second angle are greater than 60 degrees, respectively, wherein an absolute value of the difference between the first maximum brightness and the second maximum brightness is less than or equal to 30% ($\leq$30%) of the first maximum brightness.

According to the present application, a display device is provided. The display device includes a display panel, and a backlight module as described above to provide light for the display panel.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

Embodiments of the present application provide a backlight module, a light guide plate thereof and a display device using the same, wherein a light guide plate having light adjustment structures is provided, so that light passing through the light guide plate has a large outgoing light angle. The light guide plate of one of the applied embodiments may be suitably combined with an optical sheet, such as a reverse prism sheet, to provide a backlight module having collimated light. The backlight module of the embodiment may be applied to a plurality of different types of display devices, wherein the applied display device includes a display panel and a backlight module that may provide light for an embodiment of the display panel. The present application does not limit the type of display device to be applied. In an application example, the backlight module may provide maximum brightness when viewing the display device of the backlight module of the application example with a horizontal viewing angle of 0 degrees; and the brightness provided by the backlight module is extremely low when the horizontal viewing angle exceeds 30 degrees, for example, the normalized brightness is less than 10%.

Figure 1A:
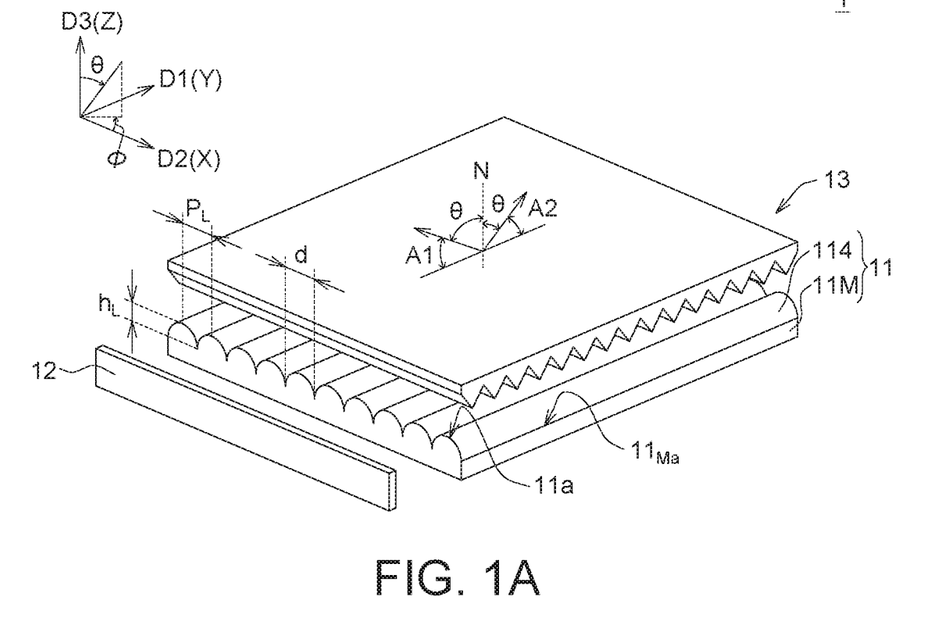
FIG. 1A is a perspective view of a backlight module according to an embodiment of the present application.
Figure 1B:
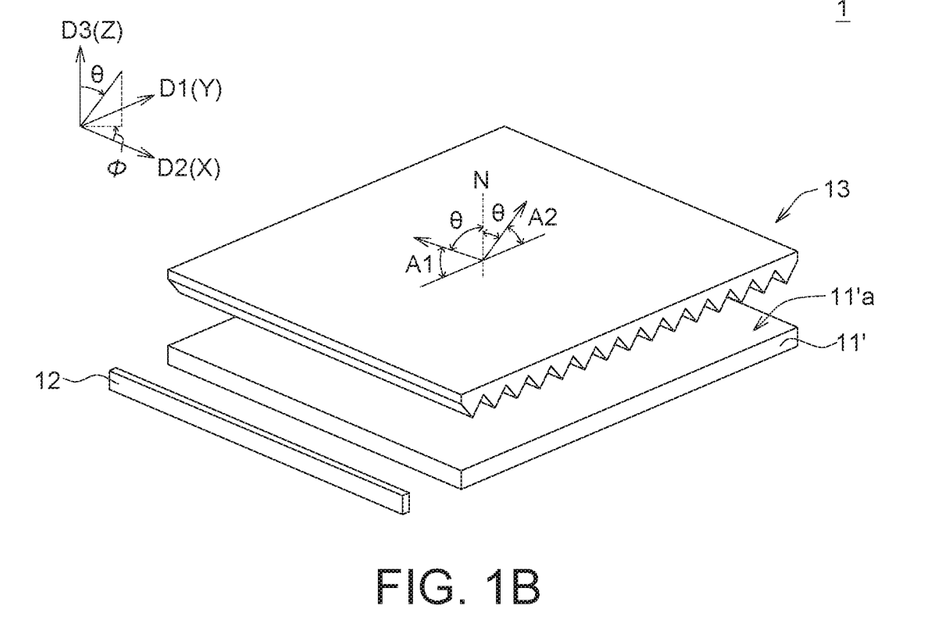
FIG. 1B is a perspective view of a backlight module according to another embodiment of the present application.
Figure 2A:
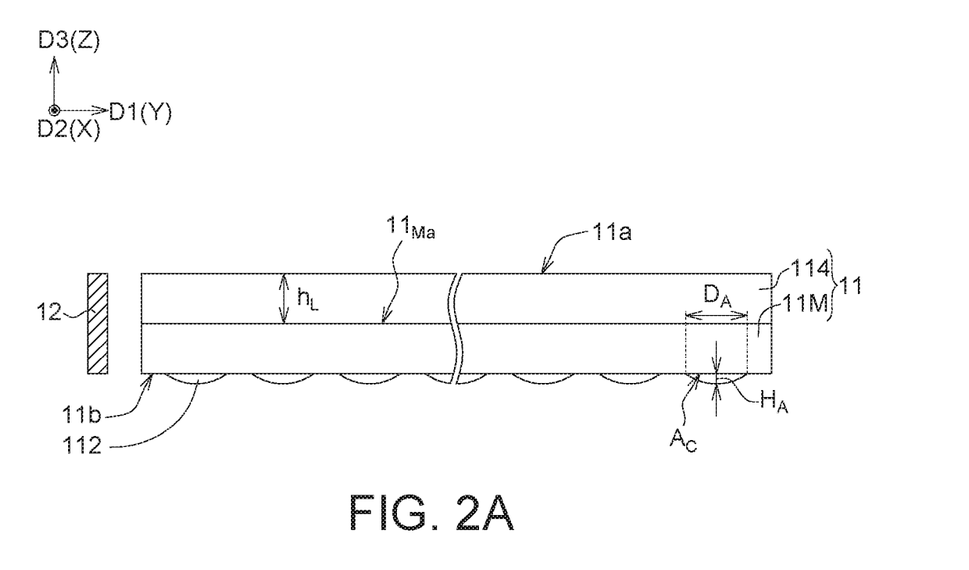
FIG. 2A is a schematic cross-sectional view of a light source and a light guide plate according to an embodiment of the present application.

Embodiments of the present application will be described in detail below with reference to the accompanying drawings. It should be noted that the structures, processes, and contents of the embodiments are merely illustrative, and the scope of the present application is not limited to the aspects described. It is to be understood that the present application does not show all possible embodiments, and is not to be construed as being limited by the scope of the application, and the structure and process of the embodiments may be varied and modified to meet the needs of the application for one of ordinary skill in the art. Therefore, other implementations not presented in this application may also be applicable. For example, the following figures (FIG. 1A, FIG. 2A to FIG. 2C) illustrate a light guide plate including a lenticular as an example, but the present application does not use the light guide plate as shown in FIG. 1A and FIG. 2A to FIG. to be limited; other light guide plate configurations (such as shown in FIG. 1B) that do not include a lenticular but have the light-adjusting structure of the embodiment are also applicable embodiments of the present application. As long as the light distribution on the surface of the light guide plate in the first direction is consistent with the characteristics of the present application, it is covered by the present application.

Further, in the embodiments, the same or similar elements are designated by the same or similar reference numerals for clarity. In addition, the drawings have been simplified to clearly illustrate the contents of the embodiments, and the scale ratios in the drawings are not drawn to scale in accordance with the actual products, and thus are not intended to limit the scope of the application. In addition, the use of ordinal numbers such as "first," "second," "third," and the like, as used in the specification and the claims, are intended to modify the elements of the claims, and are not intended to be any previous ordinal, and do not represent the order of a claimed element and another claimed element, or the order of the manufacturing method. The use of these ordinals is only used to make a claimed element with a certain name having a clear distinction to another claimed element that has the same name. In addition, when a first material layer is referred to be on or above a second material layer, unless particularly defined, otherwise the first material layer may be directly in contact with the second material layer. Alternatively, it is also possible to have one or more layers of other materials interposed, in which case there may be no direct contact between the first material layer and the second material layer. Furthermore, the description refers to space-related terms that may be used in the claims, such as "beneath", "below", "lower", "above", "on", "upper" or similar terms are used to facilitate the description and reference to the spatial relationship between one element or feature and another element or feature as illustrated in the drawings. It will thus be apparent to those skilled in the art that these spatially related terms further include the orientation of the elements that are different from the drawings in use or operation in addition to the orientation of the elements as illustrated in the drawings. Therefore, the terms used in the specification and claims are used to describe the embodiments only, and are not intended to limit the scope of the application.

FIG. 1A is a perspective view of a backlight module according to an embodiment of the present application. FIG. 1B is a perspective view of a backlight module 1 according to another embodiment of the present application. The difference between FIG. 1A and FIG. 1B is that the light guide plate 11 of FIG. 1A includes a plurality of lenticulars 114 disposed on a main portion 11M, and the light guide plate 11' of FIG. 1B may not include a lenticular 114, and the light guide plate 11' of FIG. 1B may also optionally include other patterns to replace the lenticular 114, such as a convex or concave surface or other patterned structure, the present disclosure is not limited thereto, and the above embodiments are all applicable to the light guide plate 11 of the present application.

Figure 2B:
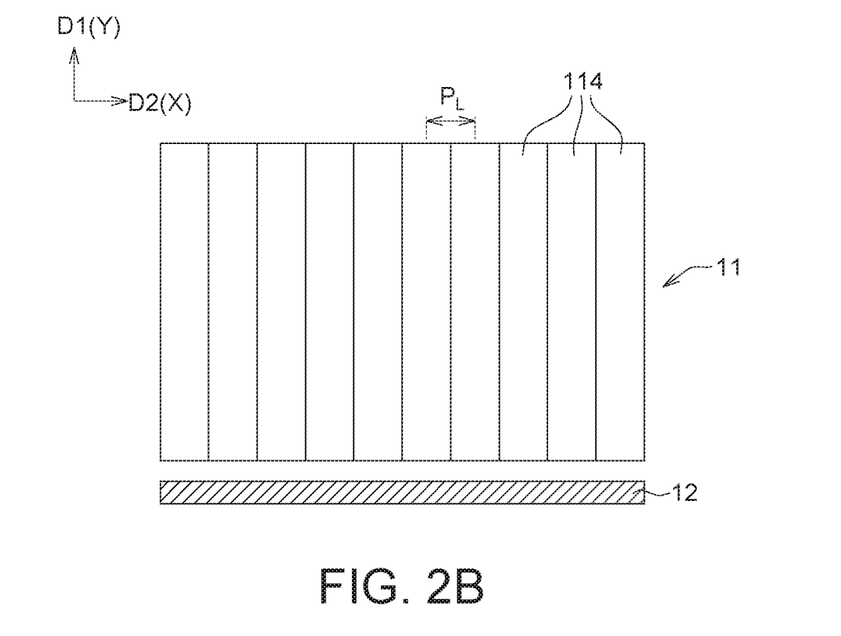
FIG. 2B is a top view of a light source and a light guide plate according to an embodiment of the present application.
Figure 2C:
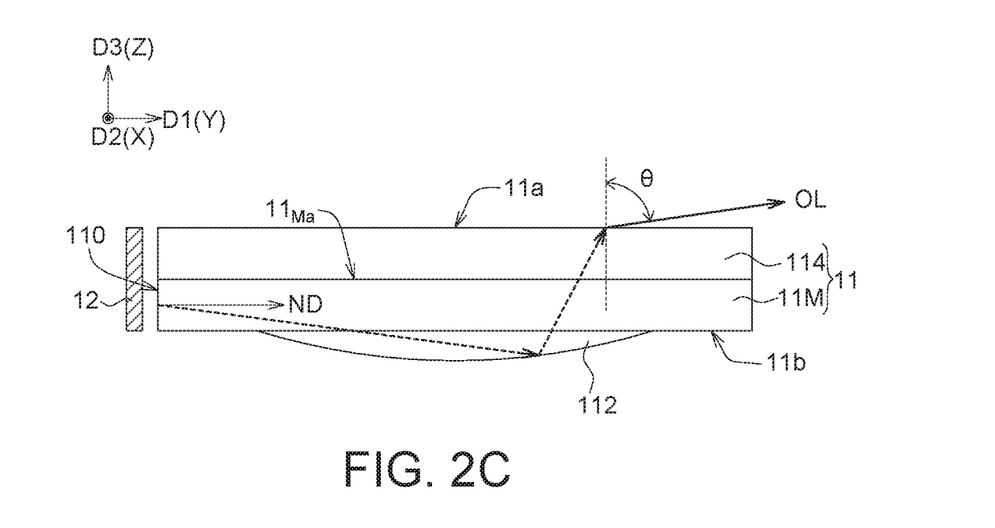
FIG. 2C is a schematic view showing the light emitted from the light source of FIG. 2A passing through the light guide plate at a small horizontal angle.

FIG. 2A is a schematic cross-sectional view of a light source 12 and a light guide plate 11 according to an embodiment of the present application. FIG. 2B is a top view of a light source 12 and a light guide plate 11 in an embodiment of the present application. FIG. 2C is a schematic view showing the light emitted from the light source 12 of FIG. 2A passing through the light guide plate 11 at a small horizontal angle. FIGS. 2A-2C are an example of an embodiment of the backlight module 1 as shown in FIG. 1A. In one embodiment, a backlight module 1 includes a light guide plate 11, a light source 12 disposed adjacent to the light guide plate 11, and an optical sheet 13 disposed on the light guide plate 11. The light guide plate 11 has an upper surface 11a (outgoing light surface), a lower surface 11b, and light-adjusting structures 112. The light-adjusting structures 112 are located on the lower surface 11b. The optical sheet 13 is disposed opposite to the upper surface 11a of the light guide plate 11. In this example, the light guide plate 11 includes a main portion 11M and a plurality of lenticulars 114 disposed on the upper surface $11_{Ma}$ of the main portion 11M. Further, for example, a line connecting the highest points of the lenticular 114 is the upper surface 11a of the light guide plate 11. In an embodiment, the lower surface 11b may be substantially equal to the lower surface of the main portion 11M. According to the embodiment, the light emitted by the light source 12 passes through the upper surface 11a of the light guide plate 11 and is the outgoing light OL. The outgoing light OL has a brightness distribution in the normal direction ND of the direction parallel to the light incident surface 110 (for example, the first direction D1). In this example, the light emitted from the light source 12 passes through the main portion 11M and the lenticular 114 as the outgoing light OL, as shown in FIG. 2C. In FIG. 2C, after the guided light is totally reflected by a single light-adjusting structure 112, and then emitted from the upper surface 11a of the light guiding plate 11 (that is, through the lenticular 114), the light is emitted at a small horizontal angle, as a simple example of the present application. The embodiment of present application includes a plurality of light-adjusting structures 112 distributed on the lower surface 11b of the light guide plate 11. The plurality of light-adjusting structures 112 may be distributed on the lower surface 11b of the light guide plate 11 in an equidistant, unequal or random arrangement depending on requirements of the design. The light incident surface 110 may have some micro roughness, but the two adjacent sides of the light incident surface 110 respectively have two directions extending substantially, and the plane formed by the two directions is an outgoing light surface, or the plane in which the average height of the fluctuation of the light incident surface can be found is defined as the outgoing light surface of the light guide plate 11.

In another embodiment, the upper surface 11'a of the light guide plate 11' is the upper surface of the main portion of the light guide plate 11' in FIG. 1B. If the light guide plate 11' further includes other patterns, the upper surface 11'a of the light guide plate 11' is the surface formed by the line connecting the highest points of these patterns. The light emitted from the light source 12 passes through the upper surface 11'a of the light guide plate 11' and is the outgoing light OL. The outgoing light OL has a brightness distribution in the normal direction ND of the direction parallel to the light incident surface 110 (for example, the first direction D1).

In this example, as the first direction D1 (e.g. Y-direction) and the second direction D2 (e.g. X-direction) shown in FIGS. 1A, 2A, 2B, the first direction D1 may be substantially perpendicular to the second direction D2. The light source 12 includes a plurality of light-emitting elements, such as light-emitting diodes. These light-emitting diodes are, for example (but not limited to), disposed along the second direction D2, and the distance between the light guide plate 11 and the light source 12 is, for example (but not limited to), from small to large (from near to far) in the first direction D1. The light emitted by the light source 12 passes through the light guide plate 11 and has a first brightness distribution in the first direction D1 (FIGS. 2A, 2B). In this example, the third direction D3 (e.g. Z-direction) is a normal direction of the plane (XY plane) in which the first direction D1 and the second direction D2 are located.

Figure 3:
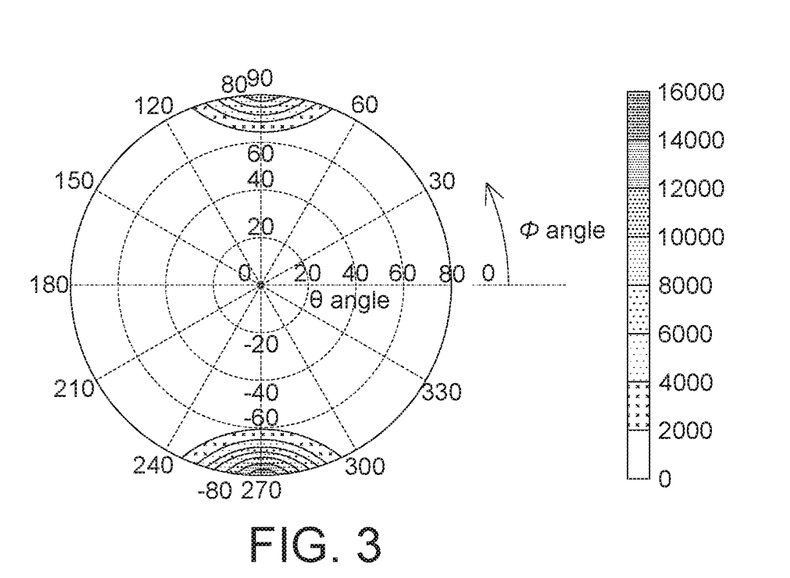
FIG. 3 is a conoscopic image measured by a conosopy at an approximate center of the light guide plate after light passing through a light guide plate according to an embodiment of the present application.

FIG. 3 is a conoscopic image measured by a conoscopy at a position near the geometric center of the light guide plate 11 after the light passing through a light guide plate 11 according to an embodiment of the present application. FIG. 3 is measured approximately close to a geometric center position of the upper surface 11a of the light guide plate 11 of FIG. 1A, or is measured approximately at a geometric center position close to the upper surface 11'a of the light guide plate 11' of FIG. 1B. The following alternatives are shown in FIG. 1A as an illustration, and are not intended to limit the light guide plate configuration of the present disclosure.

Referring to FIG. 1A and FIG. 3 simultaneously, the marking scales (20, 40, 60, 80) of the plurality of dotted circles arranged in a concentric manner in FIG. 3 are angles θ, which represent the tilt angle between the light of the measuring point and the third direction D3 (for example, the Z-direction of FIG. 1A); and the plurality of indication lines radiating outward from the center of the circle in FIG. 3, that is, the scales on the outermost circle (0, 30, 60, . . . 330) is the azimuth angle φ which is the light distribution of the measuring points counterclockwise on the XY plane as shown in FIG. 1A. In this example, the angle of the angle θ tilted in the third direction D3 (e.g Z-direction) toward the azimuth angle φ in the first direction D1 (e.g. Y-direction) of FIG. 3 which is 90 degrees is defined as a positive value, that is, the angle θ is greater than zero degrees and less than or equal to 80 degrees, in this case, it indicates a tilt angle direction from the normal direction N viewing angle to the direction away from the light source 12 (i.e. the viewer is tilted from the normal direction N viewing angle toward the direction away from the light source 12 to view a display area). The angle θ of FIG. 3 toward the first direction D1 and the azimuth angle φ of the second direction D2 which is 270 degrees is negative, that is, the angle of the angle θ is less than zero degrees and greater than or equal to −80 degrees, thus in this case, it indicates a direction of tilt angle from the normal direction N viewing angle toward the light source 12 (i.e. the viewer is tilted from the normal direction N viewing angle toward the direction close to the light source 12 to view a display area). Furthermore, the area indicated on FIG. 3 is a contour map of the measured brightness value nits in different interval ranges (0, 2000, 4000, . . . , 16000), and the interval range may be arbitrarily set, and only the observable limit required in the relative relationship of the brightness distribution in the conoscopic image may be within the range.

Please refer to FIGS. 1A, 2A, and 2B together. The conoscopic image of FIG. 3 shows the outgoing light direction of the light source 12 after passing through the light guide plate 11, for example, two ranges of tilt angles which tilt approximately along the first direction D1 (e.g. Y-direction) and in the direction relative to the third direction D3 (e.g. Z-direction) close to and away from the light source 12 have a high brightness distribution (i.e. away from the normal direction N viewing angle), respectively, and both of the brightness distributions are similar, while an extremely low brightness distribution is between the central normal direction N viewing angle (the angle θ equal to 0 degrees) and the angle θ having an absolute value of about 60 degrees, which is approximately lower than 15% of the maximum brightness. Therefore, the brightnesses which are greater than 50% of the maximum brightness are gathered to the range of the angle θ having absolute values greater than 70 degrees.

As shown in the conoscopic image of FIG. 3, along the direction of the azimuth angle φ which is 90 degrees and 270 degrees, that is, the first direction D1 (e.g. Y-direction), when the absolute value of the angle θ is greater than 60 degrees or more, the brightness values greater than 2000 nits appear. In the upper and lower viewing angle regions where the first maximum brightness and second maximum brightness appear, the brightness distribution is similar. For example, when the angle θ is greater than 60 degrees and the azimuth angle φ is 70 degrees to 110 degrees, a brightness distribution having a brightness value greater than 2000 nits is started, that is, when the angle θ is greater than 60 degrees and the brightness value is greater than 2000 nits, the azimuth angle φ is distributed in the range of 40 degrees (110 degrees−70 degrees=40 degrees). For another example, when the angle θ is less than −60 degrees and the azimuth angle φ is 245 degrees to 295 degrees, a brightness distribution having a brightness value greater than 2000 nits is started, that is, when the absolute value of the angle θ is greater than 60 degrees and the brightness value is greater than 2000 nits, the azimuth angle φ of the brightness distribution is in the range of 50 degrees (295 degrees−245 degrees=50 degrees).

Compared with the known light guide plate, in which the brightness distribution is mostly concentrated in a single viewing angle area distribution, or in which the brightness distribution range of the greater brightness has a greater range of the absolute value of the azimuth angle φ of the brightness distribution and the absolute value of the angle θ of the brightness distribution, the brightness distribution is obviously diffused and less concentrated than that of the present disclosure. Therefore, according to the light guide plate 11 design of the embodiment of the present application, the light guide plate 11 may appear the first maximum brightness and the second maximum brightness in which the brightness values (normalized brightness values) are close to each other in the two viewing angle regions close to and away from the light source 12, approximately along the direction of the larger tilt angle in a normal direction N view along the first direction D1 (e.g. Y-direction) (larger absolute value of the angle θ), and the brightness distribution patterns of the two viewing angle regions are also similar.

Figure 4:
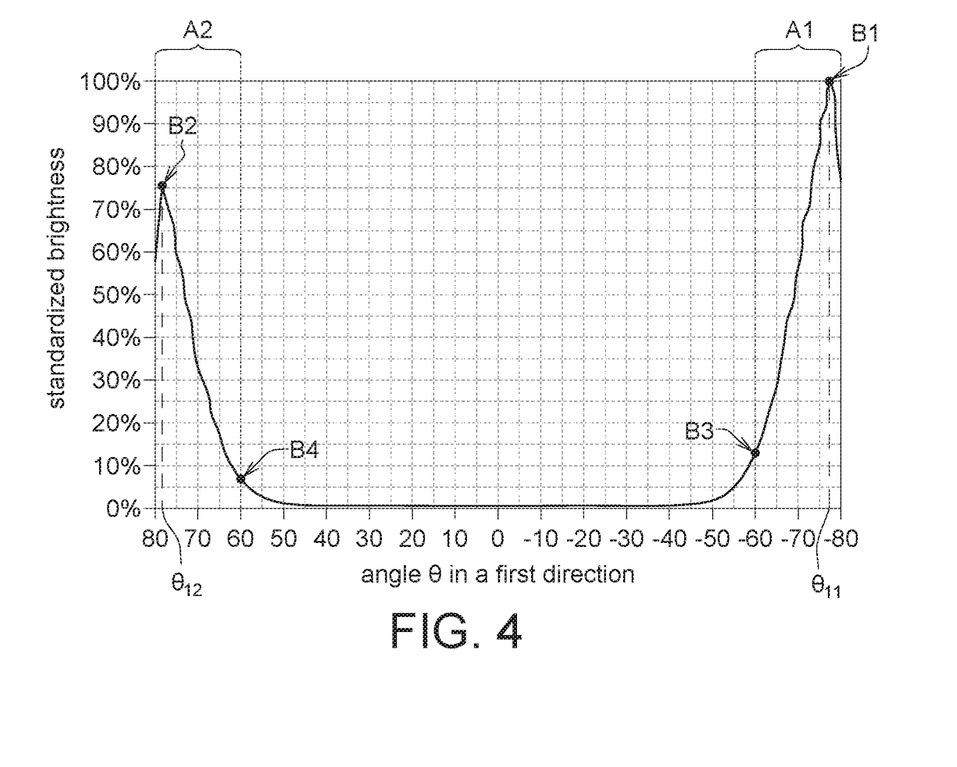
FIG. 4 is a curve showing a first brightness distribution in a first direction after light emitted by a light source passing through a light guide plate according to an embodiment of the present application.

FIG. 4 is a curve showing a first brightness distribution along a first direction D1 after light emitted by a light source 12 passes through a light guide plate 11 according to an embodiment of the present application. As shown in the coordinate diagram of FIG. 3, the direction along the azimuth angle φ at 90 degrees and at 270 degrees corresponds to the first direction D1 of the example. Therefore, in this example, FIG. 4 is also the first brightness distribution along the direction at the azimuth angle φ of 90 degrees to 270 degrees and the angle θ from 0 degrees to 80 degrees and from 0 degrees to −80 degrees (that is, along the first direction D1).

Therefore, the horizontal axis of FIG. 4 represents the angle θ range along the first direction D1 and having an angle of −80 degrees to 0 degrees to 80 degrees tilted with the third direction D3 (e.g. Z-direction), which corresponds to the tilting direction from close to the light source 12 to the normal direction N viewing angle and to the tilting direction away from the light source 12. The ordinate of FIG. 4 is the normalized result of percentage brightness (hereinafter referred to as standardized brightness) obtained by normalizing the brightness of the angle θ for one of the maximum brightness of FIG. 3. Referring to FIG. 4 and FIG. 2C again, the larger the angle θ is, the smaller the horizontal angle between the outgoing light OL and horizontal planes of the first direction D1 and the second direction D2 is, indicating that the brightness distribution of the outgoing light L, which is obtained by the light emitted from the light source 12 passing through the light guide plate 11 and the light-adjusting structure 112, is mainly concentrated in the small horizontal angle direction.

As shown in FIG. 4, in an embodiment, the first brightness distribution of the light emitted by the light source 12 after passing through the light guide plate 11 is along the first direction D1 (e.g. Y-direction, corresponding to the direction along the azimuth angle φ of 90 degrees to 270 degrees of FIG. 3). In the results of the normalized brightness distribution at different angles θ, it may be seen that the two viewing angle regions of the large angle θ corresponding to the light guide plate 11 away from the third direction D3 (e.g. Z-direction) have a first maximum brightness B1 and a second maximum brightness B2, respectively. The first maximum brightness B1 is standardized to 100% brightness. The first maximum brightness B1 corresponds to the first angle $\theta_{11}$, and the second maximum brightness B2 corresponds to the second angle $\theta_{12}$, and the absolute values of the angle θ of the first angle $\theta_{11}$ and the second angle $\theta_{12}$ are greater than 60 degrees, respectively. The absolute value of the difference between the first maximum brightness B1 and the second maximum brightness B2 is less than or equal to 30% of the first maximum brightness B1 (≤30%×first maximum brightness B1). In one example, the first angle $\theta_{11}$ and the second angle $\theta_{12}$ are respectively the angles with respect to a normal direction N of an outgoing light surface (e.g., the upper surface 11a) of the light guide plate 11 in the first direction D1.

Referring to FIGS. 1A, 2A, 2B, and 4 simultaneously, the first direction D1 (e.g. Y-direction) may be defined as a vertical viewing angle upon viewing a display device, and the second direction D2 (e.g. X-direction) is defined as a horizontal viewing angle upon viewing a display device. The first maximum brightness B1 corresponds to the first angle $\theta_{11}$ in the first direction D1 as described in the text, and the absolute value of the first angle $\theta_{11}$ is an absolute value of the difference of the angle between the tilt angle in a top view and the 0 degrees. For example, in a non-limiting example, the angle corresponding to the angle θ in the right half of the curve in FIG. 4 is approximately between −75 degrees and −80 degrees, and has a maximum brightness B1, and the absolute value of the first angle $\theta_{11}$ is, for example, 75 degrees to 80 degrees, and its corresponding maximum brightness B1 is about 100% (standardized brightness), and maximum brightness B1 is the first maximum brightness B1 for this example.

The second maximum brightness B2 corresponds to the second angle $\theta_{12}$ in the first direction D1 described in the text, and the absolute value of the second angle $\theta_{12}$ is an absolute value of the angle θ of the difference between the tilt angle in a top view and 0 degrees. For example, in a non-limiting example, the angle corresponding to the angle θ in the left half of the curve in FIG. 4 has a maximum brightness B2 between 75 degrees and 80 degrees, and the absolute value of the second angle $\theta_{12}$ is, for example, 75 degrees to 80 degrees, its corresponding maximum brightness B2 is between about 70% and 80% (standardized brightness), and maximum brightness B2 is the second maximum brightness B2 for this example.

In the example shown in FIG. 4, the absolute value of the difference between the first maximum brightness B1 and the second maximum brightness B2 is, for example, less than or equal to 30% of the first maximum brightness B1 (≤30%× first maximum brightness B1). In another embodiment, the absolute value of the difference between the first maximum brightness B1 and the second maximum brightness B2 is, for example, less than or equal to 20% of the first maximum brightness B1 (≤20%×first maximum brightness B1). In another embodiment, the absolute value of the difference between the first maximum brightness B1 and the second maximum brightness B2 is, for example, less than or equal to 30% of the second maximum brightness B2 (≤30%× second maximum brightness B2). In another embodiment, the absolute value of the difference between the first maximum brightness B1 and the second maximum brightness B2 is, for example, less than or equal to 20% of the second maximum brightness B2 (20%×second maximum brightness B2). The smaller the absolute value of the difference in maximum brightnesses, the better the adjustment effect of the light-adjusting structure 112 of the light guide plate 11.

Referring to FIG. 4 again, in another embodiment, the absolute value of the angle θ in the first direction D1 less than or equal to 60 degrees has an extremely low brightness distribution, which is approximately lower than 15% of the maximum brightness. The brightness greater than 50% of the maximum brightness is concentrated in the range where the absolute value of the angle θ is greater than 70 degrees. The smaller the angle range in which the brightness is greater than 50% of the maximum brightness, the better the adjustment effect of the light-adjusting structure 112 of the light guide plate 11.

Furthermore, the first brightness distribution along a vertical viewing angle upon viewing a display device which is equal to 0 degrees in comparison with the angle θ is, for example, but not limited to, an asymmetric curve. That is, the first maximum brightness and the second maximum brightness may be unequal, as shown in FIG. 4. In an example, the first maximum brightness B1 is greater than or equal to the second maximum brightness B2. In a practical application (as shown in FIG. 1A), the position that the first maximum brightness B1 is generated by the light emitted by the light source 12 after passing through the light guide plate 11 (e.g. B1 of FIG. 4) is closer to the light source 12 or the position having a negative angle θ (θ: 0 to 80 degrees) between the third direction D3 (e.g. Z-direction) than the position of the second maximum brightness B2 (e.g. B2 of FIG. 4). In other words, the light emitted by the light source 12 passes through the light guide plate 11 and has a first brightness distribution in the first direction D1 and the angle θ tilted with the third direction D3. The first maximum brightness B1 and the second maximum brightness B2 of the first brightness distribution appear in the first viewing angle area A1 and the second viewing angle area A2 corresponding to the tilt angles in a top view on the light guide plate 11, respectively, in the first direction D1, and the first viewing angle area A1 has a greater brightness than the second viewing angle area A2. In another example, via the design of the light-adjusting structure 112, the maximum brightness value of the second viewing angle area A2 may be greater than the maximum brightness value of the first viewing angle area A1, as long as the maximum brightness distribution is the absolute values of the first angle $θ_{11}$ and the second angle $θ_{12}$ which are greater than the angle θ of 60 degrees, respectively.

Figure 6:
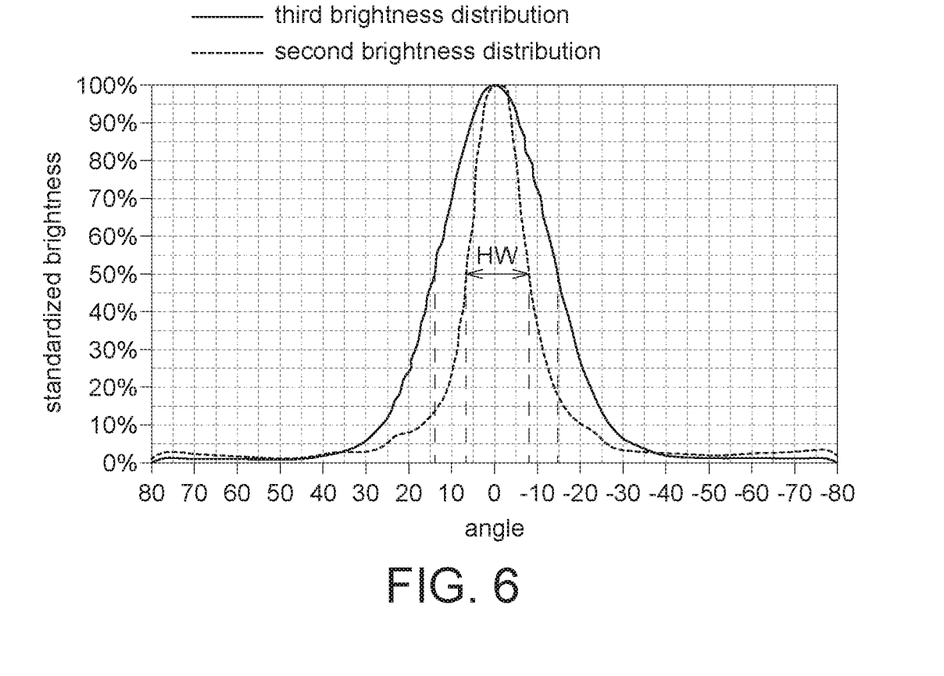
FIG. 6 is curves of one of the second brightness distributions in the first direction and one of the third brightness distributions in the second direction after the light emitted by the light source passing through the light guide plate and the optical sheet in an example of the present application.

In addition, in an embodiment, the light emitted by the light source 12 passes through the light guide plate 11 and has a first brightness distribution in the first direction D1, and the brightness value corresponding to the angle θ (the angle tilted with the third direction D3 (e.g. Z-direction)) having the absolute value equal to 60 degrees in the first brightness distributed in the first direction D1 is less than 15% of the first maximum brightness B1. In another embodiment, the light emitted by the light source 12 passes through the light guide plate 11 and the optical sheet 13 has a second brightness distribution in the first direction D1 (as shown in FIG. 6 to be described later), and the brightness value corresponding to the angle θ having the absolute value equal to 60 degrees in the second brightness distributed in the first direction D1 is less than 15% of the first maximum brightness B1. In another embodiment, the brightness value corresponding to the angle θ having the absolute value equal to 60 degrees in the first brightness distribution in the first direction D1, is less than 15% of the second maximum brightness B2. In another embodiment, the brightness value corresponding to the angle θ having the absolute value equal to 60 degrees in the second brightness distribution in the first direction D1 is less than 15% of the second maximum brightness B2. As shown in FIG. 4, the brightness value B3 corresponding to the angle θ of −60 degrees (the absolute value of the angle θ is equal to 60 degrees) in the first brightness distributed in the first direction D1 is smaller than 15% of the first maximum brightness B1 (as the maximum brightness B1 shown in FIG. 4, about 100% standardized brightness) (i.e. 100%*0.15=15%, 10%<15%). The brightness value B4 corresponding to the angle θ of 60 degrees (the absolute value of the angle θ equal to 60 degrees) in the first brightness distributed in the first direction D1 is less than 15% of the second maximum brightness B2 (such as the maximum brightness B2 shown in FIG. 4, about 76% standardized brightness) (i.e. 76%*0.15=11.4%, 6%<11.4%).

In addition, in other embodiments, the absolute values of the first angle $θ_{11}$ and the second angle $θ_{12}$ are, for example, greater than 70 degrees, or greater than 75 degrees, or greater than 80 degrees, or greater than 85 degrees, respectively. When the absolute value of the first angle $θ_{11}$ or the second angle $θ_{12}$ is larger, the light-adjusting effect of the light guide plate 11 is more concentrated. This application does not limit this much. The present application enables the first angle $θ_{11}$ corresponding to the first maximum brightness B1 and the second angle $θ_{12}$ corresponding to the second maximum brightness B2 by the design of the light-adjusting structure 112, such as the ratio of height to maximum width (e.g., radial dimension), haze value, and/or refractive index, that is, as long as the first angle $θ_{11}$ corresponding to the first maximum brightness B1 and the second angle $θ_{12}$ corresponding to the second maximum brightness B2 of the vertical viewing angle upon viewing the display device is greater than 60 degrees, respectively.

According to the embodiment, the light-adjusting structure 112 on the lower surface 11b of the light guide plate 11 has a high transmittance, and the haze value is extremely low. For example, the haze values of the light-adjusting structures 112 are greater than or equal to 0%, smaller than or equal to 10%, smaller than or equal to 5%, or smaller than or equal to 1%, Furthermore, the light-adjusting structure 112 of the embodiment may be prepared by printing dots, inkjet printing, photopolymerization, or extrusion molding, injection molding, or the like, and is formed discontinuously on the lower surface 11b of the light guide plate 11. Therefore, the material of the light-adjusting structure 112 of the embodiment may be different or the same as the material of the light guide plate 11, which is not limited in this application. In one example, the light-adjusting structures 112 are (such as transparent inks) printed on the lower surface 11b of the light guide plate 11 by screen printing. Compared to conventional screen printing inks, the transparent ink of an embodiment contains very few particles (beads, for scattering light), and even does not include particles. In addition, in an example, the absolute value of the difference between the refractive index of the light-adjusting structure 112 and the refractive index of the light guide plate 11 is, for example, in a range from 0 (both materials of the same) to 0.1 (different materials), or from 0 to 0.2 (greater than or equal to 0, less than or equal to 0.2).

The light-adjusting structure 112 may also have one or more refractive index settings; this application is not limited in this regard.

Moreover, in an embodiment, the light may be away from the light guide plate 11 at a small horizontal angle by adjusting the ratio of the height and the width (for example, the radial dimension) of the light-adjusting structure 112. Referring to FIG. 2A again, the light-adjusting structure 112 has a contact area $A_C$ with the lower surface 11b of the light guide plate 11. In an example, the ratio of the height $H_A$ (maximum height) of the light-adjusting structure 112 to the maximum width $D_A$ of the contact area $A_C$ is, for example, less than 0.02 (i.e. $H_A/D_A<0.02$). If the light-adjusting structure 112 has a circular contact area, the maximum width $D_A$ of the light-adjusting structure 112 is the diameter of the contact area $A_C$, but the application is not limited thereto. Furthermore, the cross-sectional shape of the light-adjusting structure 112 is not limited to the curved cross-section as illustrated in the drawings, and may be like as triangular or trapezoidal cross-sections, or other regular or irregular cross-sections, etc., as long as the ratio of the height $H_A$ of the light-adjusting structure 112 to the maximum width $D_A$ of the contact area $A_C$ is, for example, less than 0.02, it may be the configuration of the light-adjusting structure 112 applicable to the present application. The light-adjusting structure 112 may also be configured for the same refractive index or a plurality of different refractive index combinations at the same time, and it may be matched with the same or a plurality of different $H_A/D_A$ designs, and the two factors have impact on the adjustment for the outgoing light direction, so it may have a more flexible design space for the adjustment of the outgoing light direction, and this application does not limit this.

Moreover, the decrease in the height $H_A$ of the light-adjusting structure 112 is also beneficial for the light to exit the light guide plate 11 at a small horizontal angle. In an example, the light-adjusting structure 112 has a maximum height $H_A$ in the third direction D3 (e.g., the Z-direction), and the maximum height $H_A$ is, for example, but not limited to, less than 7 µm, or less than 3 µm, or less than 1 µm. In practical applications, the maximum height $H_A$ of the light-adjusting structure 112 depends on its maximum width $D_A$.

In addition, in an embodiment, the lenticulars 114 disposed on the main portion 11M of the light guide plate 11 are, for example, shown in FIGS. 1A, 2A, and 2B, wherein the ratio (height $h_L$/pitch $P_L$) of the height $h_L$ of the lenticulars 114 relative to the pitch $P_L$ of the lenticulars is, for example, in the range from 0.16 to 0.4. In addition, the material of the lenticulars 114 may be the same as or different from the material of the main portion 11M, and may have good light transmittance. Furthermore, the light guide plate 11 may be made of a light-transmissive resin material, and may also contain additives such as a UV absorber, an antistatic agent, an antioxidant, a processing stabilizer, a flame retardant, and a lubricant in the light-transmitting resin material, and a combination of two or more of them may be used. For example, in an example, when a light guide plate 11 is prepared by using a light-transmitting resin with a UV absorber added, it is possible to diminish the light guide plate 11 from being deteriorated by irradiation with ultraviolet rays in the light. The light guide plate 11 is usually made of a light-transmitting resin containing no light diffusing agent. The selection of the material of the light guide plate 11 in the present application is not limited as long as it does not affect the outgoing light from the light guide plate 11 of the embodiment.

In addition, it is to be noted that, in the above example, as shown in FIG. 1A and FIGS. 2A to 2C, the light guide plate 11 including the main portion 11M and the lenticulars 114 is taken as an example to explain the conoscopic image measured after the light passes through the light guide plate 11 formed by the main portion 11M and the lenticulars 114, and the first brightness distribution along the first direction D1, as shown in FIGS. 3 and 4. However, the present application is not limited to the light guide plate 11 as shown in FIG. 1A and FIGS. 2A to 2C.

A further embodiment of the present application provides a backlight module 1 having components as shown in FIG. 1A and FIG. 1B, including a light guide plate 11/11', a light source 12 disposed adjacent to the light guide plate 11/11', and an optical sheet 13 disposed on the light guide plate 11/11'. When the light from the light source 12 passes through the light guide plate 11/11' and the optical sheet 13, the collimated light effect may be achieved.

Figure 5:
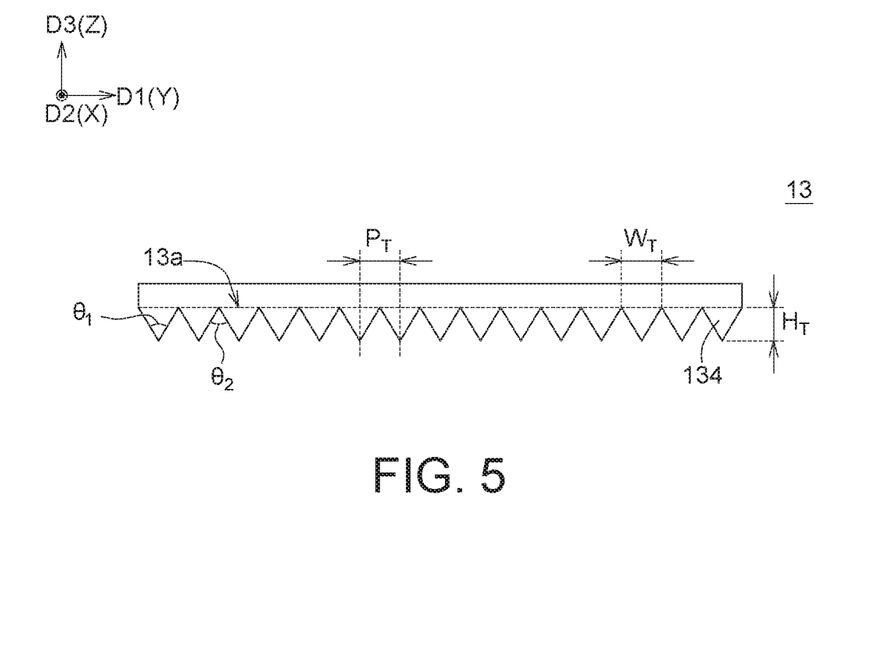
FIG. 5 is a cross-sectional view showing an optical sheet in a backlight module according to an embodiment of the present application.

FIG. 5 is a cross-sectional view showing an optical sheet 13 in a backlight module 1 according to an embodiment of the present application. Please refer to FIG. 1A and FIG. 5 at the same time. In this embodiment, for example, a reverse prism sheet is used as the optical sheet 13 provided with respect to the upper surface 11a of the light guide plate 11a s shown in FIG. 1A. The optical sheet 13 includes a first surface 13a and a plurality of prisms 134 disposed on the first surface 13a. The ratio of the height $H_T$ of the prism 134 to the bottom width $W_T$ of the prism 134 is, for example, less than or equal to 3.8, and greater than or equal to 1.6 (i.e. $1.6 \leq H_T/W_T \leq 3.8$). In an example, the lenticular 114 (for example, a semi-columnar or an arc-shaped lens) disposed at the upper surface $11_{Ma}$ of the main portion 11M of the light guide plate 11 illustrated in FIG. 1A has a lenticular axial direction (e.g., along the first direction D1), for example, orthogonal to the direction of the axial of the prisms 134 (for example, along the second direction D2) of the optical sheet 13 (FIG. 1). In another example, the axial direction of the lenticular 114 (e.g., along the first direction D1) has an angle between 87 degrees and 93 degrees with the axial direction of the prism 134 (e.g., along the second direction D2) of the optical sheet 13, for example. It may be combined with the design of the display panel, and may alleviate the undesirable phenomenon of interference fringes.

FIG. 6 is curves of one of the second brightness distributions in the first direction D1 and one of the third brightness distributions in the second direction D2 after the light emitted by the light source passes through the light guide plate 11 and the optical sheet 13 in the example of the present application. In an embodiment, the second direction D2 (e.g. X-direction) is, for example, perpendicular to the first direction D1 (e.g. Y-direction). After the light emitted from the light source 12 passes through the light guide plate 11 and the optical sheet 13, a second brightness distribution is in the first direction D1 in a range of an absolute value of the angle θ from 0 to 80 degrees along the direction of the azimuth angle φ of 90 degrees and 270 degrees, and a third brightness distribution is in the second direction D2 in a range of an absolute value of the angle θ from 0 degrees to 80 degrees along the azimuth angle φ of 0 degrees and 180 degrees, wherein a range of a half luminance width HW is in the second brightness distribution. The half luminance width HW refers to a range of absolute value of the difference of the angle θ when the standardized brightness value is 50%, for example, the half luminance width HW of the second brightness distribution is in a range of less than or equal to 25 degrees, or less than or equal to 20 degrees, or less than or equal to 15 degrees. The range of the half luminance width of the third brightness distribution (the range of the angle θ) is, for example, less than or equal to 35 degrees, or less than or equal to 30 degrees. The third brightness distribution having a range of the angle θ of greater than 10% of the maximum brightness of the third brightness distribution is, for example, less than or equal to 60 degrees, or less than or equal to 50 degrees. The second brightness distribution and the third brightness distribution may varied by the influence of the first brightness distribution of the light passing through the light guide plate 11 or the prism 134 structure of the optical sheets 13.

The following is an example of FIG. 1A, but is not intended to limit the present disclosure. Referring to FIGS. 1A, 5, and 6 simultaneously, as shown in FIG. 6, the second brightness distribution in the first direction D1 does not have a symmetrical curve with respect to the 0 degree angle of view. In this example, the half brightness width HW (the range of the angle θ) is, for example, about 13 degrees; and the half brightness width (the range of the angle θ) of the third brightness distribution in the second direction D2 is, for example, about 30 degrees; and the width of 10% of the third brightness distribution in the second direction D2 is, for example, about 60 degrees. For example, in an embodiment, the angle θ corresponding to the 10% brightness value in the right half of the curve of the third brightness distribution in the second direction D2 in FIG. 6 is about −25 degrees, and the angle θ of less than or equal to 10% of the brightness value is less than or equal to about −25 degrees. That is, the brightness value is less than 10% when the absolute value of the angle θ is greater than 25 degrees. For example, in an example, the angle θ corresponding to the 10% brightness value in the left half of the curve of the third brightness distribution in the second direction D2 in FIG. 6 is about 25 degrees, and the absolute value of the angle θ less than or equal to 10% of the brightness value is greater than or equal to 25 degrees. It may be seen that after the light emitted by the light source 12 passes through the light guide plate 11 and the optical sheet 13, the main light source of the brightness value greater than 10% in the second direction D2 is concentrated in the range where the absolute value of the angle θ is less than 25 degrees. The backlight module 1 thus designed has light centralized function. After the light emitted by the light source 12 passes through the light guide plate 11 and the optical sheet 13, the brightness value is less than or equal to 10% of the maximum brightness when the absolute value of the angle θ is greater than or equal to 25 degrees in the second direction D2. In one embodiment, when the observer views the display panel of the applied embodiment with respect to the normal direction N of the display panel at a viewing angle of a tilt angle more than 25 degrees in the second direction D2, since the brightness value is less than or equal to 10%, it is difficult to clearly see the information on the display screen, and it is generally difficult for the observer to clearly recognize the change in the brightness difference, thereby having the effect of diminish the information on the display screen of the display device from being peeped by the surrounding observer.

Figure 7A:
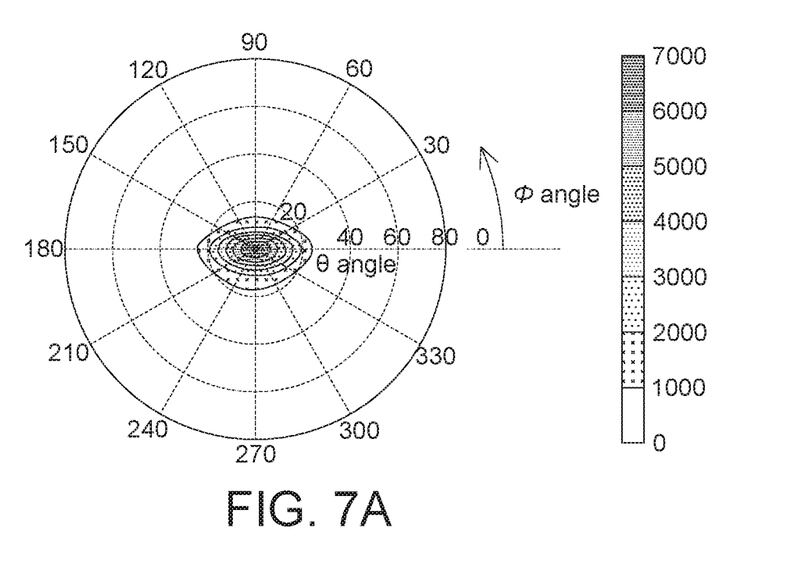
FIG. 7A is a conoscopic image measured by a conoscopy after the light passing through a light guide plate and an optical sheet according to an embodiment of the present application.
Figure 7B:
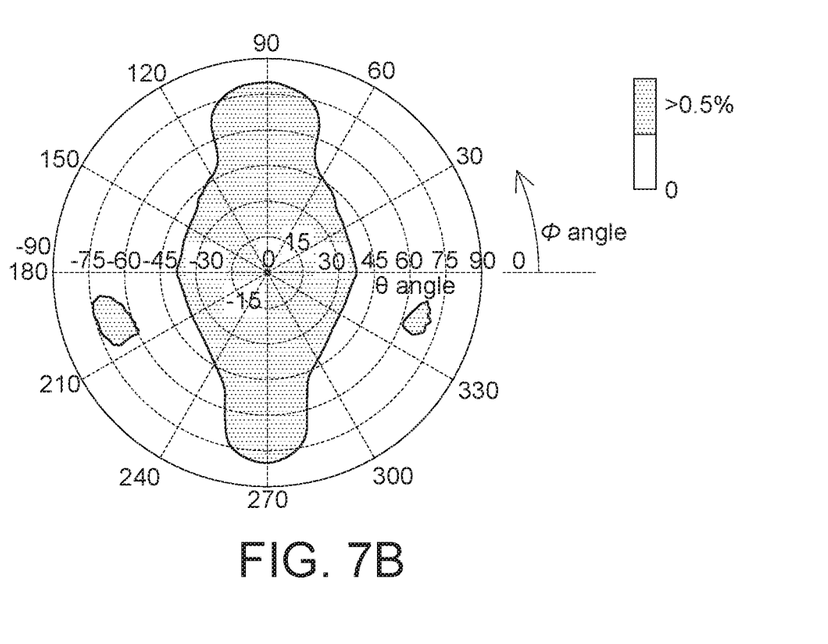
FIG. 7B is an image showing the simulation results of the brightness distribution of the light emitted by the light source after passing through the light guide plate, the optical sheet, and a display panel.

FIG. 7A is a conoscopic image obtained after a light passing through the light guide plate 11 and the optical sheet 13 according to an embodiment of the present application, and measured with a conoscopy. FIG. 7B is a schematic diagram showing the simulation results of the brightness distribution of the light emitted by the light source 12 after passing through the light guide plate 11, the optical sheet 13, and a display panel, and the conoscopic image with 0.5% standardized brightness is indicated on the figure, and the central area surround by lines is the area where the brightness is greater than 0.5% of standardized brightness, and the left and right side areas outside the surrounded central area is the area where the brightness is smaller than 0.5% of standardized brightness, for example, in a range which is greater than the absolute value of the angle θ about 40 degrees in the second direction D2. FIG. 7A clearly shows that after the light passing through the light guide plate 11 and the optical sheet 13 of the embodiment, the outgoing light brightness distribution of the backlight module 1 is very concentrated, and FIG. 7B shows the simulation results of the brightness distribution after the light passing through the light guide plate 11, the optical sheet 13 and the display panel of the embodiment, and the light is concentrated in the central area viewed by the observer to achieve an excellent collimated light effect. In addition, since the brightness of the left and right areas is extremely low, the observers located on the left and right sides of the center area (the tilt angle of view is, for example, 40 degrees or more) is difficult to see the screen information displayed on the display panel, and the anti-peep and information confidentiality may be achieved.

Furthermore, in an embodiment, after the light emitted by the light source 12 passes through the light guide plate 11 and the optical sheet 13, a brightness value corresponding to an absolute value of the angle θ greater than or equal to (≥) 25 degrees in the second brightness distribution formed in the first direction D1 is less than or equal to 10% of the maximum brightness of the second brightness distribution. As shown in FIG. 6, the maximum brightness of the second brightness distribution of this example is 100%, and when the absolute value of the angle θ of the second brightness distribution is 25 degrees, the corresponding brightnesses are about 8% and 5%, both of which are lower than 10% of the maximum brightness. Moreover, when the absolute value of the angle θ of the second brightness distribution is greater than 25 degrees, the corresponding brightness is lower.

Furthermore, in an embodiment, after the light emitted by the light source 12 passes through the light guide plate 11 and the optical sheet 13, the brightness corresponding to the absolute value of the angle θ greater than or equal to (≥) 35 degrees in the third brightness distribution formed in the second direction D2 is less than or equal to 10% of the maximum brightness of the third brightness distribution. As shown in FIG. 6, the maximum brightness of the third brightness distribution of this example is 100%, when the absolute value of the third brightness distribution is equal to 35 degrees, the corresponding brightness is about 4% and 3%, both of which are lower than 10% of the maximum brightness. Furthermore, when the absolute value of the third brightness distribution is greater than 35 degrees, the corresponding brightness is lower.

In addition, in an example, the optical sheet 13 includes a plurality of prisms 134 disposed on the first surface 13a thereof, wherein the prisms 134 may have prism angles $\theta_1$ (FIG. 5) of, for example, but not limited to, 62 degrees to 72 degrees. In one example, the angle $\theta_2$ between two adjacent ones of prisms 134 is, for example, but not limited to, in a range from 87 degrees to 93 degrees. The design concept of the light guide plate 11 is to concentrate the light passing through the light guide plate 11 to the direction having larger absolute value of the angle θ through the design of the light-adjusting structure 112, and reduce the light source distribution of the smaller angle in the absolute value, that is, increase the light source distribution of the large angle in the absolute value. The design of the prism angle $\theta_1$ or the angle $\theta_2$ is mainly designed according to Snell's law. The effect is that it may match to the light emitted by the light source 12 and concentrated on a large angle after passing through the light guide plate 11, and may achieve the effect of central angle concentration. The design of the plurality of prisms 134 of the optical sheet 13 enables the light emitted from the light source 12 to pass through the light guide plate 11 and the optical sheet 13 to have a better light collecting effect. Moreover, in an example, the prism 134 has a pitch $P_T$ greater than 0 μm and less than 100 μm. Of course, the foregoing numerical values are for illustrative purposes only, and may be appropriately modified and adjusted depending on the conditions of actual application.

The following is a related experiment on the refractive index and configuration of the light-adjusting structure 112 on the light guide plate 11 in the embodiment, and several sets of experimental results are as follows.

Figure 8A:
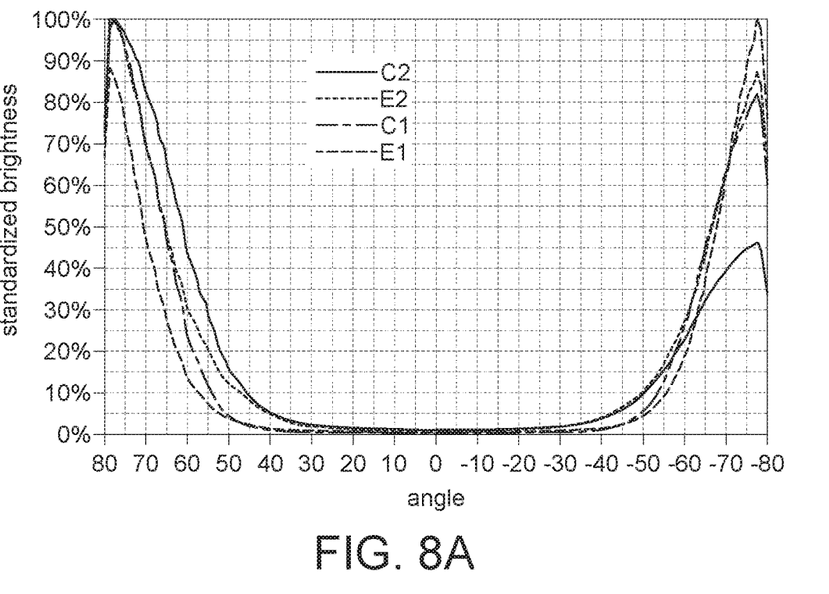
FIG. 8A is curves of a first brightness distribution in a first direction after light emitted by a light source passing through a light guide plate in a plurality of related experiments.
Figure 8B:
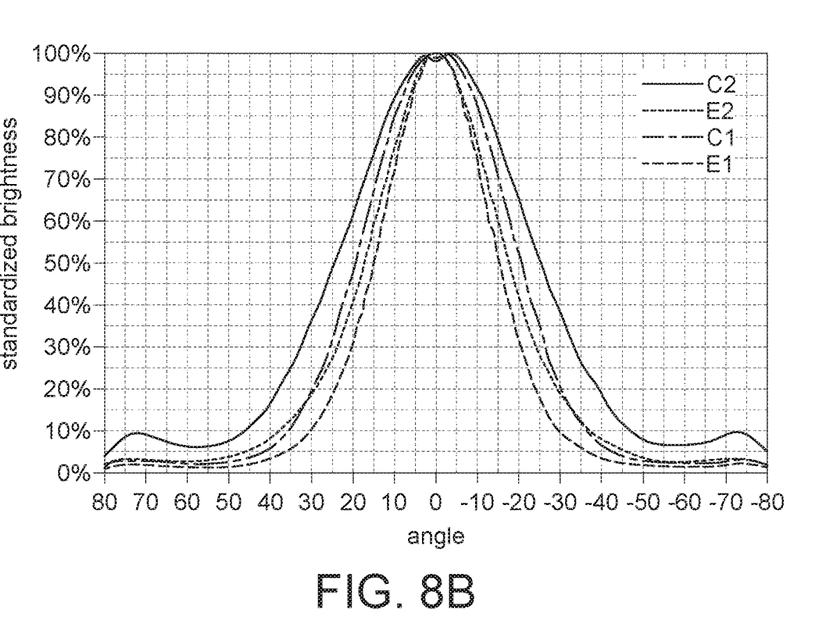
FIG. 8B is curves of a third brightness distribution in a second direction after light emitted from a light source passing through the light guide plate and the optical sheet in a plurality of related experiments.

FIG. 8A is curves of a first brightness distribution in a first direction D1 after light emitted by a light source 12 passes through a light guide plate 11 in a plurality of sets of related experiments. FIG. 8B is a graph of a third brightness distribution in a second direction D2 after light emitted from a light source 12 passes through the light guide plate 11 and the optical sheet 13 in a plurality of sets of related experiments. The brightness distributions of FIGS. 8A and 8B may be respectively referred to descriptions of the brightness distribution of FIGS. 4 and 6 described above, and the description thereof will not be repeated here.

The refractive index of the light guide plate is 1.55. The relevant physical parameters of the light-adjusting structure 112 represented by each of the curves in FIGS. 8A, 8B are as follows.

Curve E1: the refractive index of the light-adjusting structure 112 is 1.49, and a height of the light-adjusting structure 112 ($H_A$ of FIG. 2A) is 4.19 μm, and the maximum width ($D_A$ of FIG. 2A) is 382.60 μm, and a ratio of $H_A/D_A$ is 0.011.

Curve E2: the refractive index of the light-adjusting structure 112 is 1.49, and a height of the light-adjusting structure 112 ($H_A$ of FIG. 2A) is 6.95 μm, and the maximum width ($D_A$ of FIG. 2A) is 388.89 μm, and a ratio of $H_A/D_A$ is 0.018.

Curve C1: the refractive index of the light-adjusting structure 112 is 1.4, and a height of the light-adjusting structure 112 ($H_A$ of FIG. 2A) is 12.53 μm, and the maximum width ($D_A$ of FIG. 2A) is 388.40 μm, and a ratio of $H_A/D_A$ is 0.032.

Curve C2: the refractive index of the light-adjusting structure 112 is 1.55 and a height of the light-adjusting structure 112 ($H_A$ of FIG. 2A) is 15.36 μm, and the maximum width ($D_A$ of FIG. 2A) is 328.57 μm, and a ratio of $H_A/D_A$ is 0.047.

As shown in FIG. 8A, the higher the ratio of $H_A/D_A$ (for example, curve C2), the lower the brightness value corresponding to an angle of about −75 degrees in the first brightness distribution. The light-adjusting structure 112 of the embodiment having a $H_A/D_A$ ratio of less than 0.02 (e.g., curves E1, E2) has a relatively high brightness value (e.g. above 87%) for angles of about 75 degrees and −78 degrees. Furthermore, as shown in FIG. 8B, in the third brightness distribution curve in the second direction after the light passes through the light guide plate 11 and the optical sheet 13, when the ratio of $H_A/D_A$ is lower (for example, curves E1 and E2), the absolute value of the angle θ of smaller than or equal to 10% of the maximum brightness of the third brightness distribution is greater than 35 degrees, and a good anti-peep effect may be achieved. If the absolute value of the angle θ is greater than 30 degrees, the better the anti-peep effect may be achieved. As shown in FIG. 8B, in the curves of the third brightness distribution in the second direction after the light passes through the light guide plate 11 and the optical sheet 13, when the ratio of $H_A/D_A$ is higher (for example, curve C2), the absolute value of the angle θ of greater than 10% of the maximum brightness of the third brightness distribution is greater than that of which having a lower ratio of the $H_A/D_A$ (for example, curves E1, E2), and a better light collecting effect may be achieved.

As shown in FIG. 8B, the magnitude of the refractive index (for example, curves C1<E1=E2<C2) and the ratio of $H_A/D_A$ (for example, curves E1<E2<C1<C2) contribute to the influence of the third brightness distribution. Moreover, the magnitude of the refractive index and the ratio of $H_A/D_A$ also contribute to the light distribution or the brightness distribution after the light emitted from the light source 12 passes through the light guide plate 11, the light emitted from the light source 12 passes through the light guide plate 11 and the optical sheet 13, or the light emitted from the light source 12 passes through the light guide plate 11 or the optical sheet 13 and display panel. The conoscopy may be used to measure and confirm whether the expected results of the design may be achieved. This is not described here.

Figure 9:
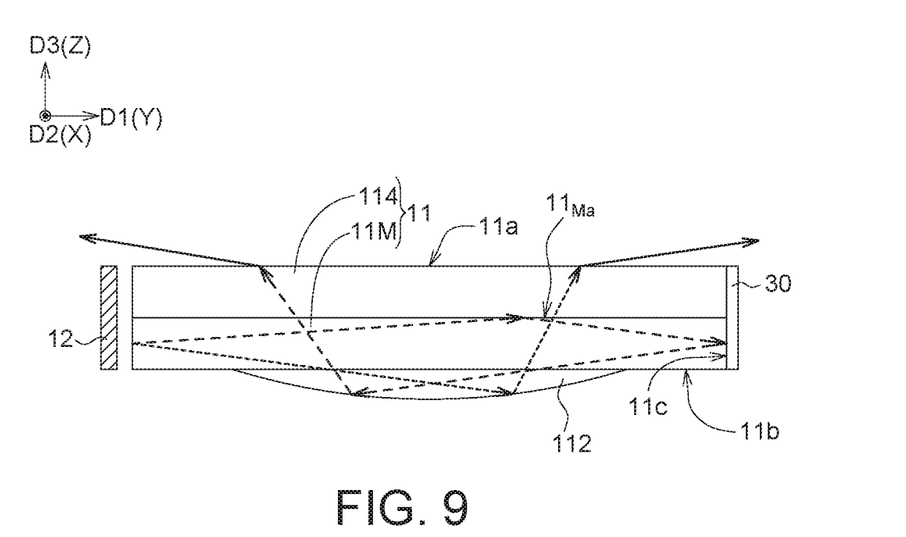
FIG. 9 is a cross-sectional view showing a light guide plate according to another embodiment of the present application.

Furthermore, in the backlight module 1 of this embodiment, other optical films such as a brightness enhancement film (BEF) or a diffusion film may be further included depending on the needs of the actual application. Other components may also be included, such as providing a reflective sheet under the light guide plate 11 or providing a side reflective sheet disposed on the side of the light guide plate 11, FIG. 9 is a cross-sectional view showing a light guide plate according to another embodiment of the present application. The same components in FIG. 9 and FIG. 2A are denoted by the same reference numerals. Therefore, regarding to the details of the related layers and components in FIG. 9 including elements/layers and their spatial arrangement, please refer to FIG. 2A for details, and this is not repeated here. As shown in FIG. 9, a side reflective sheet 30 may be disposed on a side surface 11c of the light guide plate 11 away from the light source 12, for example, a silver coated side reflective sheet 30 is attached, and the reflection of the light that may not passed through the light-adjusting structure 112 may be increased, and a greater amount of light may be maintained in a small horizontal angle of the outgoing light angle.

In summary, the embodiment provides a backlight module, and particularly includes a light guide plate having a light-adjusting structure, so that the light passing through the light guide plate has a larger angle for outgoing light. The light guide plate of one of the applied embodiments is combined with a suitable optical sheet (for example, a reverse prism sheet) to provide a backlight module having collimated light. Furthermore, the light guide plate may be fabricated in a simple manner to form the light-adjusting structure as proposed in the above embodiments. For example, when applied to the manufacture of a medium or large size backlight module, the light-adjusting structure of the embodiment may be, for example, formed by screen printing, having the optimized collimated light effect, or lower cost, suitable for mass production.

Other embodiments, such as various arrangements and arrangements of known components, or related components are made of different materials, and the like, and may also be applied, for example, a structure, a configuration, a material of a light guide plate, an optical sheet may be adjusted or modified in an appropriate manner according to the actual needs and conditions of the application. The structure shown in the specification and drawings is for illustrative purposes only and is not intended to limit the scope of the application. In addition, it is to be understood by those skilled in the art that the shapes and positions of the components in the embodiments are not limited to those illustrated in the drawings, and may be adjusted according to the requirements and/or manufacturing steps in actual applications which are not deviated from the spirit of the present application, accordingly.

While the present disclosure has been described in its preferred embodiments, the present disclosure is not intended to be limited thereto. Although some embodiments of the present disclosure and their advantages have been described in detail, it should be understood that various changes, substitutions and alterations can be made herein without departing from the spirit and scope of the disclosure as defined by the appended claims. The scope of the present disclosure therefore should be accorded the broadest interpretation so as to encompass all such changes, substitutions and alterations, all of the appended claims and combinations of different embodiments.

What is claimed is:

1. A backlight module, comprising:
a light guide plate having an upper surface, a lower surface, and a plurality of light-adjusting structures, wherein the plurality of light-adjusting structures are disposed on and in contact with the lower surface;
an optical sheet disposed opposite to the upper surface of the light guide plate; and
a light source disposed adjacent to the light guide plate, wherein a light emitted by the light source includes a characteristic of a first brightness distribution in a first direction after passing through the light guide plate, the first brightness distribution has a first maximum brightness and a second maximum brightness, the first maximum brightness corresponds to a first angle, the second maximum brightness corresponds to a second angle, and an absolute value of the first angle and an absolute value of the second angle are greater than 60 degrees, respectively;
wherein an absolute value of a difference between the first maximum brightness and the second maximum brightness is less than or equal to 30% of the first maximum brightness;
wherein the first angle and the second angle are respectively an angle in the first direction with a normal direction of an outgoing light surface of the light guide plate.

2. The backlight module according to claim 1, wherein the first brightness distribution has a brightness value corresponding to an absolute value of an angle equal to 60 degrees in the first direction being less than 15% of the first maximum brightness.

3. The backlight module according to claim 1, wherein a brightness value of the first brightness distribution having an absolute value of an angle equal to 60 degrees is less than 15% of the second maximum brightness.

4. The backlight module according to claim 1, wherein the light emitted by the light source further includes a characteristic of a second brightness distribution in the first direction after passing through the light guide plate and the optical sheet, wherein the second brightness distribution has a half brightness width, and a range of the half brightness width is less than or equal to 25 degrees.

5. The backlight module according to claim 4, wherein a brightness value corresponding to an absolute value of an angle greater than or equal to 25 degrees in the second brightness distribution is less than or equal to 10% of a maximum brightness of the second brightness distribution.

6. The backlight module according to claim 4, wherein the light emitted by the light source further includes a characteristic of a third brightness distribution in a second direction after passing through the light guide plate and the optical sheet, the second direction is perpendicular to the first direction, a brightness value corresponding to an absolute value of an angle greater than or equal to 35 degrees in the third brightness distribution is less than or equal to 10% of a maximum brightness of the third brightness distribution.

7. The backlight module according to claim 1, wherein one of the plurality of light-adjusting structures of the lower surface of the light guide plate has a maximum height and a maximum width, a ratio of the maximum height relative to the maximum width is less than 0.02 (maximum height/maximum width<0.02).

8. The backlight module according to claim 7, wherein the maximum height is less than 7 µm.

9. The backlight module according to claim 1, wherein the first maximum brightness is greater than the second maximum brightness.

10. The backlight module according to claim 1, wherein the first maximum brightness of the light emitted by the light source after passing through the light guide plate is located closer the light source than the second maximum brightness.

11. The backlight module according to claim 1, wherein the first brightness distribution has a brightness value corresponding to an absolute value of the angle equal to 60 degrees in the first direction being less than 15% of the second maximum brightness.

12. The backlight module according to claim 1, wherein an absolute value of the first angle and an absolute value of the second angle are greater than 70 degrees, respectively.

13. The backlight module according to claim 1, wherein an absolute value of a difference between a refractive index of the plurality of light-adjusting structures and a refractive index of the light guide plate is in a range from 0 to 0.2.

14. The backlight module according to claim 1, further comprising a plurality of lenticulars disposed on a main portion of the light guide plate, wherein a ratio of a height of the lenticulars relative to a pitch of the lenticulars is in a range from 0.16 to 0.4.

15. The backlight module according to claim 1, wherein the optical sheet includes a first surface and a plurality of prisms disposed on the first surface.

16. The backlight module according to claim 15, wherein the plurality of prisms have a prism angle in a range from 62 degrees to 72 degrees.

17. The backlight module according to claim 15, wherein an angle between two adjacent ones of the plurality of prisms is in a range from 87 degrees to 93 degrees.

18. A light guide plate, comprising an upper surface, a lower surface, and a plurality of light-adjusting structures, wherein the plurality of light-adjusting structures are located on and in contact with the lower surface; and a light has a first brightness distribution in a first direction after passing through the light guide plate, the first brightness distribution has a first maximum brightness and a second maximum brightness, the first maximum brightness corresponds to a first angle, the second maximum brightness corresponds to a second angle, and an absolute value of the first angle and an absolute value of the second angle are greater than 60 degrees, respectively;

wherein an absolute value of a difference between the first maximum brightness and the second maximum brightness is less than or equal to 30% of the first maximum brightness;

wherein the first angle and the second angle are respectively an angle in the first direction with a normal direction of an outgoing light surface of the light guide plate.

19. A display device comprising:
    a display panel; and
    a backlight module, comprising:
        a light guide plate having an upper surface, a lower surface, and a plurality of light-adjusting structures, wherein the plurality of light-adjusting structures are located on and in contact with the lower surface;
        an optical sheet disposed opposite to the upper surface of the light guide plate; and
        a light source disposed adjacent to the light guide plate, wherein a light emitted by the light source has a first brightness distribution in a first direction after passing through the light guide plate, and the first brightness distribution has a first maximum brightness and a second maximum brightness, wherein the first maximum brightness corresponds to a first angle, the second maximum brightness corresponds to a second angle, and an absolute value of the first angle and an absolute value of the second angle are greater than 60 degrees, respectively, wherein an absolute value of a difference between the first maximum brightness and the second maximum brightness is less than or equal to 30% of the first maximum brightness;

wherein the first angle and the second angle are respectively an angle in the first direction with a normal direction of an outgoing light surface of the light guide plate.

* * * * *